(12) United States Patent
Obkircher et al.

(10) Patent No.: US 9,859,945 B2
(45) Date of Patent: *Jan. 2, 2018

(54) DECODER FOR ANTENNA SWITCH

(71) Applicant: SKYWORKS SOLUTIONS, INC., Woburn, MA (US)

(72) Inventors: Thomas Obkircher, Santa Ana, CA (US); Bo Zhou, Acton, MA (US); Nuttapong Srirattana, Billerica, MA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,191

(22) Filed: Jun. 9, 2017

(65) Prior Publication Data

US 2017/0279483 A1     Sep. 28, 2017

Related U.S. Application Data

(62) Division of application No. 15/359,445, filed on Nov. 22, 2016, now Pat. No. 9,692,479, which is a division of application No. 14/927,198, filed on Oct. 29, 2015, now Pat. No. 9,548,786.

(60) Provisional application No. 62/073,026, filed on Oct. 31, 2014, provisional application No. 62/136,971, filed on Mar. 23, 2015.

(51) Int. Cl.
  *H04B 1/44* (2006.01)
  *H04B 1/401* (2015.01)

(52) U.S. Cl.
  CPC .............. *H04B 1/44* (2013.01); *H04B 1/401* (2013.01)

(58) Field of Classification Search
  CPC .......... H04B 1/401; H04B 1/44; H04B 1/006; H03M 1/00; H03M 7/00
  See application file for complete search history.

(56) References Cited

U.S. PATENT DOCUMENTS

| 2009/0180403 | A1* | 7/2009 | Tudosoiu | ............... H04B 1/006 370/278 |
| 2014/0227982 | A1* | 8/2014 | Granger-Jones | ..... H04B 7/0404 455/77 |
| 2015/0249479 | A1* | 9/2015 | Nobbe | ................... H04B 17/12 455/77 |

* cited by examiner

*Primary Examiner* — Tuan Pham
(74) *Attorney, Agent, or Firm* — Chang & Hale LLP

(57) ABSTRACT

An antenna switch module includes a radio-frequency input port, a radio-frequency output port, a radio-frequency core connected between the radio-frequency input port and the radio-frequency output port, the radio-frequency core being configured to operate in each of a plurality of operational states, the plurality of operational states including a first subset of operational states and a second subset of operational states, and a decoder configured to receive an input signal indicating a first operational state of the radio-frequency core, the first operational state being of the first subset of operational states, generate an output control signal corresponding to the first operational state, detect a transition of the radio-frequency core to a second operational state, determine that the second operational state is of the second subset of operational states, and insert an intermediate output signal corresponding to an intermediate operational state of the radio-frequency core in response to said determination.

20 Claims, 7 Drawing Sheets

DECODER FOR ANTENNA SWITCH

RELATED APPLICATIONS

This application is a divisional of U.S. patent application Ser No. 15/359,445, filed on Nov. 22, 2016, entitled RADIO-FREQUENCY SWITCH DECODER, which is a divisional of U.S. patent application Ser. No. 14/927,198, filed on Oct. 29, 2015, entitled DYNAMIC SWITCH CONTROLLER, which claims priority to U.S. Provisional Application Nos. 62/073,026, filed Oct. 31, 2014 and entitled DYNAMIC SWITCH CONTROLLER, and 62/136,971, filed Mar. 23, 2015 and entitled DYNAMIC SWITCH CONTROLLER, the disclosures of which are hereby incorporated by reference in their entirety.

BACKGROUND

Field

The present disclosure generally relates to the field of electronics, and more particularly, to radio-frequency (RF) modules and devices.

Description of Related Art

RF devices may include one or more antenna switch modules. In some antenna switch modules, input and output switch state transitions can result in an undesirable "all off" condition in certain situations.

SUMMARY

In some implementations, the present disclosure relates to a radio-frequency (RF) module comprising an RF input port, an RF output port and an RF core connected between the RF input port and the RF output port and including one or more RF devices, the RF core being configured to operate in each of a plurality of operational states, the plurality of operational states including a first subset of operational states and a second subset of operational states. The RF module further comprises a decoder configured to receive an input signal indicating a first operational state of the RF core, the first operational state being of the first subset, generate an output control signal corresponding to the first operational state, detect a transition of the RF core to a second operational state, determine that the second operational state is of the second subset, and insert an intermediate output signal corresponding to an intermediate operational state of the RF core in response to said determination.

In certain embodiments, said insertion of the intermediate output signal substantially prevents an ALL-OFF condition with respect to one or more of the RF input port and RF output port. The intermediate output signal may cause a delay in transition of at least one of the one or more RF devices. The plurality of RF devices may include a plurality of transistors, the output control signal controlling operation of the plurality of transistors. In certain embodiments, the plurality of RF devices comprises a first switch circuit and a second switch circuit. The decoder may include a first clock signal input for receiving a first clock signal and a second clock signal input for receiving a second clock signal. For example, the first clock signal may be provided by a negative voltage generator.

In some implementations, the present disclosure relates to a decoder for a radio-frequency (RF) module comprising a control signal output and first control signal generator circuitry configured to receive an input signal indicating an operational state of an RF core communicatively coupled to the decoder, and generate an output control signal for controlling one or more RF devices of the RF core. The decoder further comprises second control signal generator circuitry configured to generate an intermediate output signal and transition detection circuitry configured to receive a least a portion of the input signal and selectively provide the intermediate output signal on the control signal output when the input signal indicates a transition of the RF core for a first operational state of a first group of operational states to a second operational state of a second group of operational states.

The first control signal generator circuitry may include a static combinatorial circuit. In certain embodiments, the transition detection circuitry is configured to provide the intermediate output signal for a determined period of time. The decoder may be configured to receive a first clock signal and a second clock signal, the second clock signal indicating when the period of time has lapsed. The transition detection circuitry may be configured to determine the period of time based on delay selection input signal identifying one of a plurality of possible delay time periods. In certain embodiments, the transition detection circuitry includes a counter configured to provide a done count signal when the period of time has lapsed.

The transition detection circuitry may be configured to selectively provide either first and second portions of the output control signal together or provide the first portion of the output control signal together with the intermediate output signal. The decoder of claim 8 wherein the transition detection circuitry includes a multiplexer configured to selectively provide either a first portion of the output control signal or the intermediate output signal at an output of the multiplexer. In certain embodiments, the input signal includes values from a plurality of registers.

In some implementations, the present disclosure relates to a method for controlling a radio-frequency (RF) module. The method comprises receiving an input signal indicating an operational state of an RF core configured to operate in each of a plurality of operational states, the plurality of operational states including a first subset of operational states and a second subset of operational states. The method further comprises determining a first operational state of the RF core based on the input signal, the first operational state being of the first subset, generating an output control signal corresponding to the first operational state, detecting a pending transition of the RF core to a second operational state, the second operational state being of the second subset, generating an intermediate output signal based on said detection and selectively providing the intermediate output signal to the RF core based on said detection.

In certain embodiments, the intermediate output signal causes a delay in transition of one or more RF devices of the RF core. The RF core may include a plurality of transistors, the output control signal controlling operation of the plurality of transistors.

The method for controlling the RF module may further comprise selecting a delay period of time from among a plurality of delay periods and delaying at least in part transition of the RF core to the second operational state by said providing the intermediate output signal to the RF core. The transition detection circuitry may be configured to determine the period of time based on delay selection input signal identifying one of a plurality of possible delay time periods.

In some implementations, the present disclosure relates to a wireless device comprising an antenna configured to receive an RF signal and an RF module including an RF input port communicatively coupled to the antenna and an RF output port, the RF module further including an RF core connected between the RF input port and the RF output port and including one or more RF devices, the RF core being configured operate in each of a plurality of operational states, the plurality of operational states including a first subset of operational states and a second subset of operational states. The wireless device further comprises a decoder configured to receive an input signal indicating a first operational state of the RF core, the first operational state being of the first subset, generate an output control signal corresponding to the first operational state, detect a transition of the RF core to a second operational state, determining that the second operational state is of the second subset, and insert an intermediate output signal corresponding to an intermediate operational state of the RF core in response to said determination. In certain embodiments, the decoder is a component of the RF module.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

DESCRIPTION

The headings provided herein are for convenience only and do not necessarily affect the scope or meaning of the claimed invention.

Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Figure 1:
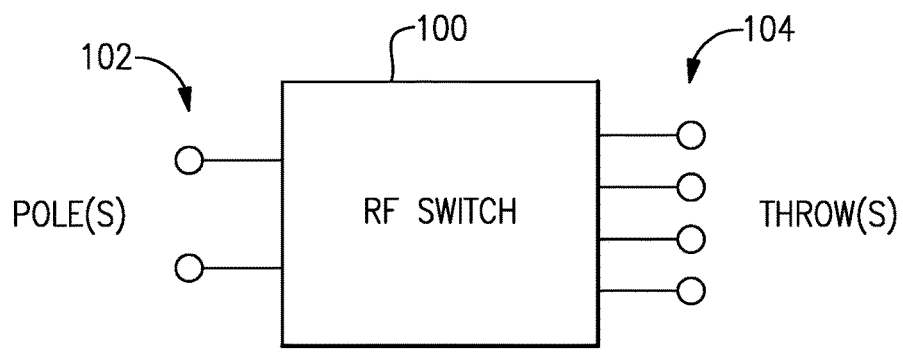
FIG. 1 is a block diagram illustrating a radio-frequency (RF) switch according to one or more embodiments.

Example Components of a Switching Device:

FIG. 1 schematically shows a radio-frequency (RF) switch 100 configured to switch one or more signals between one or more poles 102 and one or more throws 104. In some embodiments, such a switch can be based on one or more field-effect transistors (FETs). When a particular pole is connected to a particular throw, such a path is commonly referred to as being closed or in an ON state. When a given path between a pole and a throw is not connected, such a path is commonly referred to as being open or in an OFF state.

Figure 2:
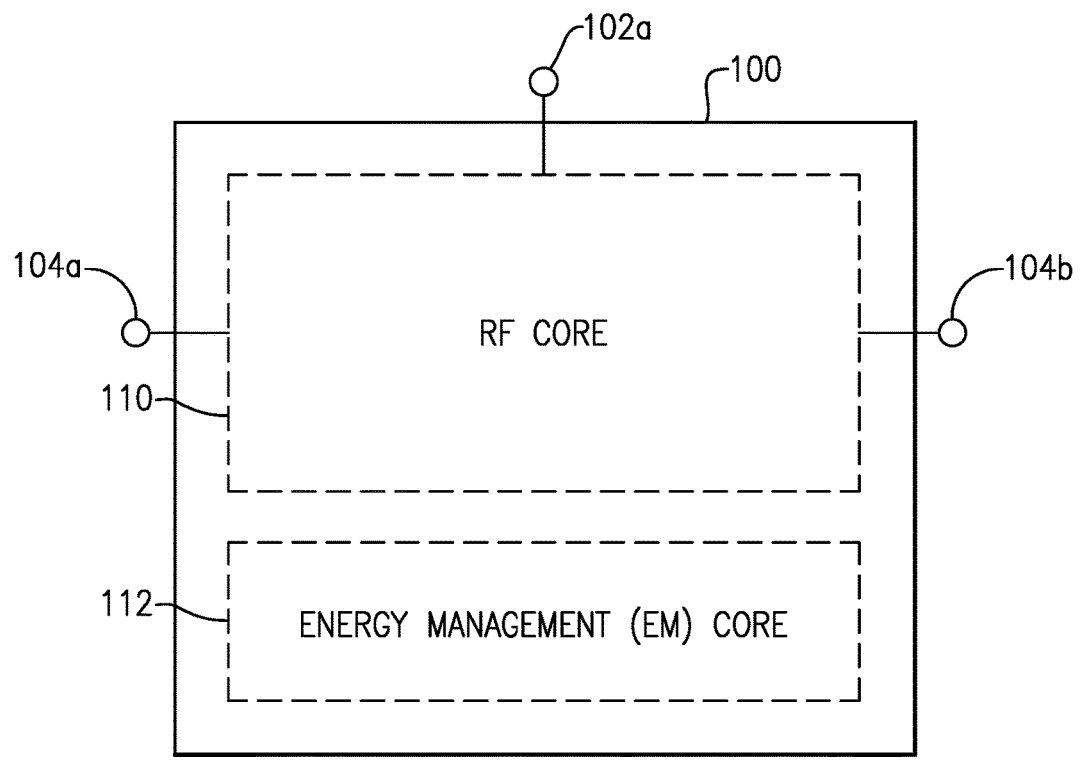
FIG. 2 is a block diagram illustrating a radio-frequency (RF) switch including an RF core and an energy management core according to one or more embodiments.

FIG. 2 shows that in some implementations, the RF switch 100 of FIG. 1 can include an RF core 110 and an energy management (EM) core 112. The RF core 110 can be configured to route RF signals between the first and second ports. In the example single-pole-double-throw (SPDT) configuration shown in FIG. 2, such first and second ports can include a pole 102a and a first throw 104a, or the pole 102a and a second throw 104b.

In some embodiments, EM core 112 can be configured to supply, for example, voltage control signals to the RF core. The EM core 112 can be further configured to provide the RF switch 100 with logic decoding and/or power supply conditioning capabilities.

In some embodiments, the RF core 110 can include one or more poles and one or more throws to enable passage of RF signals between one or more inputs and one or more outputs of the switch 100. For example, the RF core 110 can include a single-pole double-throw (SPDT or SP2T) configuration as shown in FIG. 2.

Switch Transition Issues

Figure 3:
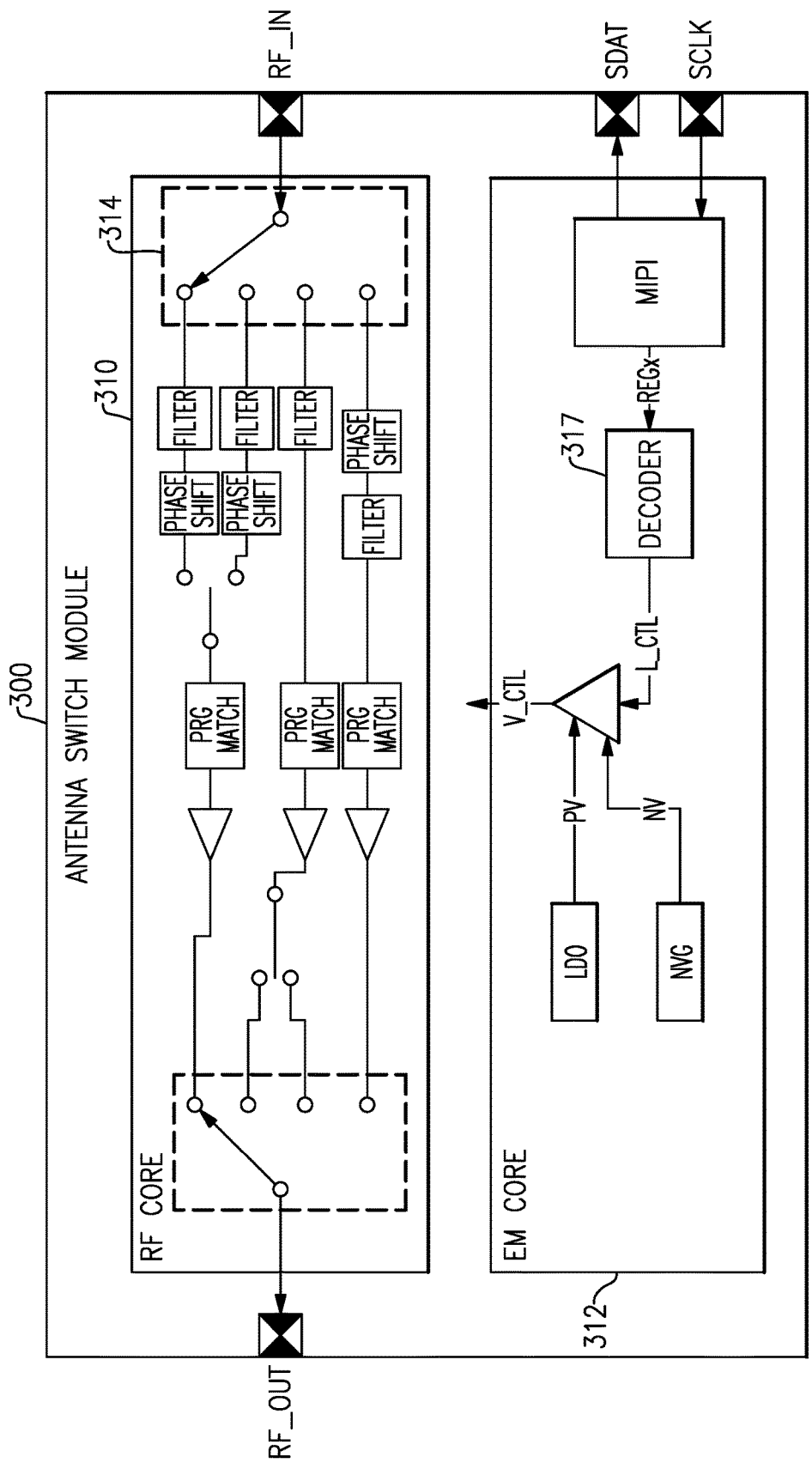
FIG. 3 is a block diagram of an antenna switch module according to one or more embodiments.

FIG. 3 is a block diagram of an antenna switch module (ASM) 300 according to one or more embodiments disclosed herein. The ASM 300 may be a multi-band antenna switch module. The ASM 300 includes a Radio Frequency (RF) core 310 and an Energy Management (EM) core 312. The RF core 310 may comprise an input switch 314, which may be connected to an antenna (not shown). The input switch 314 may be coupled to one or more internal signal paths, which may have associated therewith various low-noise amplifiers (LNA) and/or filters, as well as an output switch configured to at least partially combine the internal signal paths to a single output RF port.

In certain embodiments, input switch selection, output switch selection and/or amplifier configuration signals may be controlled at least in part by the EM core 312. The EM core 312 may be configured to receive commands using a software-controlled interface register-map, wherein the commands may be decoded based at least in part on a look-up table comprising values corresponding to, for example, all possible states of the switch. The decoder 317 of the EM core 312 may provide a substantially static combinatorial circuit for control signal generation.

Due to differences of switching delays, while transitioning between two states, an "ALL-OFF" condition may occur in certain embodiments, which may result in non-linearity at the output RF port in the presence of input power. For example, such a condition may occur when switching from a non-carrier aggregated mode to a carrier-aggregated mode or vice-versa. In certain embodiments, a specific delay may be added to the switch control signals using extended routing and/or delay cells, wherein the turning off or on of one or more of the switches is delayed by some amount to at least partially prevent occurrence of an ALL-OFF condition. However, such a configuration may increase the physical area of the module to some degree. Furthermore, as delays can vary across processes, voltage and/or temperature, it may be difficult to guarantee substantially complete resolution in order to prevent such problems in all corner cases. In addition, in certain embodiments, such delays may be applied for all the relevant state transitions, even where they are not required or desirable.

In certain embodiments, the EM core 312 may be configured to define intermediate states in the register-map, such that the software may insert such intermediate states during certain critical state transitions. However, such an embodiment may be associated with substantial overhead to the control interface, which may increase overall system control complexity.

As referenced above, the decoder 317 of the EM core 312 may be configured to decode certain signal settings and control the various switches of the RF core 310, along with possibly other devices or configurations. The decoder 317 may implement a substantially static decoder truth table. Such a table may define a current state of the RF core 310 using one or more register bits as input, wherein the decoder 317 may translate the input register bits into the logical control signal (L_CTL). The EM core 312 may further include a negative voltage generator NVG configured to provide a negative voltage signal (NV) for generating the negative voltage levels for the voltage control signal (V_CTL). The EM core 312 may further include a low-dropout regulator (LDO), which may be configured to condition the power supply (e.g., battery supply) into positive voltage for providing the positive control voltage. The control signal (V_CTL) may be of any type of control signal, having any number of bits or configuration. In certain embodiments, the control signal (V_CTL) is implemented using a parallel control bus, wherein a high signal (e.g., approximately 2.2 V) holds a switch in an ON state, whereas a low signal (e.g., approximately −2.2 V) holds a switch in an OFF state. With respect to parallel control busses, references herein to "control signal," "signal," or the like may refer to the parallel lines or signals collectively or individually.

Dynamic Switch Controller

Certain embodiments disclosed herein provide a fully-integrated, dynamic mechanism for at least partially preventing transition glitches and/or ALL-OFF conditions. Certain embodiments provide for substantially automatic insertion of intermediate states within the decoder only for certain state transitions (e.g., required or crucial state transitions). Certain embodiments may operate to completely eliminate the ALL-OFF condition on the RF port and substantially ensure good linearity.

Figure 4:
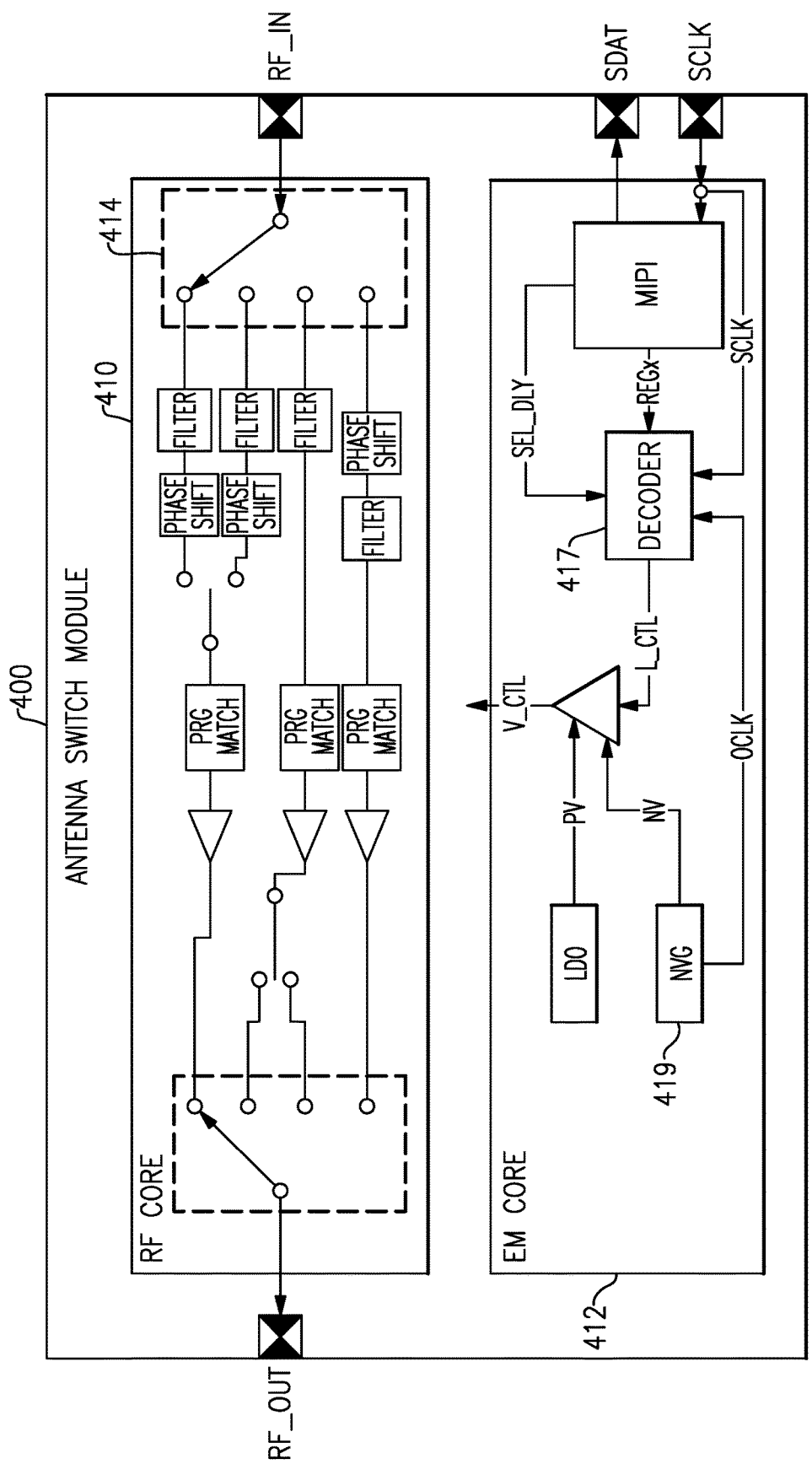
FIG. 4 is a block diagram of an antenna switch module according to one or more embodiments disclosed herein.

FIG. 4 is a block diagram of an antenna switch module (ASM) 400 according to one or more embodiments disclosed herein. The ASM 400 may be similar in certain respects to the ASM 300 of FIG. 3, although, unlike the ASM 300 of FIG. 3, the ASM 400 may be designed to support dynamic translation. The ASM 400 may be a multi-band antenna switch module. The ASM 400 includes an EM core 412 comprising an enhanced decoder 417. The decoder 417 may be configured to utilize a plurality of clock signals (identified for convenience as "SCLK" and "OCLK" in FIG. 4). The decoder may be configure to receive as an input a clock signal used by the negative voltage generator (NVG) 419 to implement the dynamic translation logic. Alternatively or additionally, the decoder 417 may utilize a clock signal from a ring oscillator, or the like. In certain embodiments, the decoder 417 further utilizes a delay selection input signal (identifies as "SEL_DLY[1:0]").

The first clock signal, SCLK, may be an external interface clock signal, wherein certain control registers may be updated based on the first clock signal. The clock signal SCLK may be used at least in part for state transition detection. The second clock signal, OCLK, may be an internally available oscillator clock, which may be primarily used for negative voltage generator (NVG) purposes. The second clock signal may be used at least in part for delay calculation (e.g., clock signal having a frequency of approximately 2 MHz or more). The delay selection signal (SEL_DLY[1:0]) may be from a static configuration register, and may allow controlling transition delay and/or delay bypass function. For example, different delay signal values may indicate delay bypass (e.g., delay signal value of '00'), 5 µs delay (e.g., delay signal value of '01'), 10 µs delay (e.g., delay signal value of '10'), 20 µs delay (e.g., delay signal value of '11'), and/or any other desirable or suitable delay periods or associated delay signal values.

Certain embodiments disclosed herein provide a process for determining which state transitions require an intermediate state insertion, or for which an intermediate state insertion may be desirable or practical. Groups of states may be designed based on register settings from the interface. Because only certain state transitions may potentially result in an ALL-OFF condition, the translation logic may be designed to only insert intermediate states for certain state transitions. Embodiments may include any number of groups and/or states per group.

The decoder 417 may include a transition look-up table module 519 (see FIG. 5), which may be used to maintain one or more tables defining groups of states, wherein transition between the groups may be associated with the use of intermediate states. For example, three or more groups of states may be defined (certain example groups are referred to herein as "G1," "G2," "G3" for convenience), each comprising a predetermined number of states (e.g., 10 states), wherein such definition/designation may be based at least in part on a crucial configuration of one or more registers (e.g., reg_0 and reg_$_1$[6:0]). Different groups may comprise different numbers of states in certain embodiments. As an example implementation of group organization for a three-group embodiment, Tables A-C below provide example data that may at least in part be associated with such tables.

TABLE A

| Group 1 | Reg 0 | Reg 1 | | | | | | |
|---|---|---|---|---|---|---|---|---|
| State | D0 | D6 | D5 | D4 | D3 | D2 | D1 | D0 |
| 0 | 0 | 0 | 1 | 0 | 0 | 0 | 1 | 0 |
| 1 | 0 | 0 | 1 | 0 | 1 | 0 | 0 | 0 |
| 2 | 0 | 0 | 1 | 0 | 1 | 0 | 0 | 1 |
| 3 | 0 | 0 | 1 | 0 | 1 | 0 | 1 | 0 |
| 4 | 0 | 0 | 1 | 0 | 1 | 0 | 1 | 1 |
| 5 | 1 | 0 | 0 | 0 | 0 | 0 | 1 | 1 |
| 6 | 1 | 1 | 0 | 1 | 1 | 0 | 0 | 0 |
| 7 | 1 | 1 | 1 | 0 | 0 | 0 | 1 | 0 |

TABLE A-continued

| Group 1 | Reg 0 | Reg 1 | | | | | |
|---|---|---|---|---|---|---|---|
| State | D0 | D6 | D5 | D4 | D3 | D2 | D1 | D0 |
| 8 | 1 | 1 | 1 | 0 | 1 | 0 | 1 | 1 |
| 9 | 1 | 1 | 1 | 1 | 0 | 1 | 0 | 1 |

TABLE B

| Group 2 | Reg 0 | Reg 1 | | | | | |
|---|---|---|---|---|---|---|---|
| State | D0 | D6 | D5 | D4 | D3 | D2 | D1 | D0 |
| 10 | 0 | 0 | 1 | 1 | 0 | 1 | 0 | 1 |
| 11 | 0 | 0 | 1 | 1 | 1 | 0 | 1 | 1 |
| 12 | 0 | 0 | 1 | 1 | 1 | 1 | 0 | 0 |
| 13 | 0 | 0 | 1 | 1 | 1 | 1 | 0 | 1 |
| 14 | 0 | 0 | 1 | 1 | 1 | 1 | 1 | 0 |
| 15 | 1 | 0 | 0 | 0 | 0 | 1 | 0 | 1 |
| 16 | 1 | 1 | 0 | 1 | 1 | 0 | 1 | 0 |
| 17 | 1 | 1 | 1 | 0 | 0 | 1 | 0 | 0 |
| 18 | 1 | 1 | 1 | 0 | 1 | 1 | 0 | 1 |
| 19 | 1 | 1 | 1 | 1 | 0 | 1 | 1 | 1 |

TABLE C

| Group 3 | Reg 0 | Reg 1 | | | | | |
|---|---|---|---|---|---|---|---|
| State | D0 | D6 | D5 | D4 | D3 | D2 | D1 | D0 |
| 20 | 0 | 0 | 1 | 0 | 1 | 1 | 0 | 0 |
| 21 | 0 | 0 | 1 | 1 | 0 | 0 | 0 | 1 |
| 22 | 0 | 0 | 1 | 1 | 0 | 0 | 1 | 0 |
| 23 | 0 | 0 | 1 | 1 | 0 | 0 | 1 | 1 |
| 24 | 0 | 0 | 1 | 1 | 0 | 1 | 0 | 0 |
| 25 | 1 | 0 | 0 | 0 | 0 | 1 | 0 | 0 |
| 26 | 1 | 1 | 0 | 1 | 1 | 0 | 0 | 1 |
| 27 | 1 | 1 | 1 | 0 | 0 | 0 | 1 | 1 |
| 28 | 1 | 1 | 1 | 0 | 1 | 1 | 0 | 0 |
| 29 | 1 | 1 | 1 | 1 | 0 | 1 | 1 | 0 |

In certain embodiments, in order to avoid ALL-OFF transitions at the RF port, it may be necessary or desirable to introduce an intermediate state for any state transition from groups G1 or G2 to G3 as well as from G3 to G1 or G2, wherein such transition state(s) are designed to delay crucial RF control signals. Transition states may be used in a similar manner to that shown below in the example embodiment of Table D:

TABLE D

| OUTPUT SIGNALS | G1 | TRN13 | G3 | G3 | TRN13 | G1 | G2 | TRN23 | G3 | G3 | TRN23 | G2 |
|---|---|---|---|---|---|---|---|---|---|---|---|---|
| LCTL[0] | 1 | 1 | 0 | 0 | 1 | 1 | 0 | 0 | 0 | 0 | 0 | 0 |
| LCTL[1] | 0 | 0 | 0 | 0 | 0 | 0 | 1 | 0 | 0 | 0 | 0 | 1 |
| LCTL[2] | 1 | 1 | 0 | 0 | 1 | 1 | 0 | 0 | 0 | 0 | 0 | 0 |
| LCTL[3] | 0 | 1 | 1 | 1 | 1 | 0 | 0 | 1 | 1 | 1 | 1 | 0 |
| LCTL[4] | 0 | 1 | 1 | 1 | 1 | 0 | 0 | 1 | 1 | 1 | 1 | 0 |
| LCTL[5] | 1 | 0 | 0 | 0 | 0 | 1 | 1 | 0 | 0 | 0 | 0 | 1 |
| LCTL[6] | 0 | 0 | 0 | 0 | 0 | 0 | 1 | 1 | 0 | 0 | 1 | 1 |
| LCTL[7] | 1 | 0 | 0 | 0 | 0 | 1 | 0 | 0 | 0 | 0 | 0 | 0 |
| LCTL[8] | 0 | 0 | 0 | 0 | 0 | 0 | 1 | 1 | 0 | 0 | 1 | 1 |

The bit strings for each of the groups (G1, G2, G3) shown in Table D may correspond to the logical output of the decoder 417 for each of the group states, respectively. The transition states (TRN13, TRN23) may indicate when an output should be held for a period of time, or when the output should change immediately. For example, in the example of Table D, the output signal line LCTL[0] may be held when changing from group 1 to group 3, as indicated by the TRN13 value corresponding to LCTL[0] staying at a '1' value for the column representing the transition from group 1 (G1) to group 3 (G3). The delay associated with the intermediate state may correspond to any desirable period of time, such as, for example, 10 µs.

The decoder 317 shown in FIG. 3, in certain embodiments, consists only of one main combinatorial look-up table, which may map a set of register values, defining band selection and/or other modes, to a series of RF core control signals. Alternatively, the decoder 517 shown in FIG. 5 may provide certain dynamic modules, as illustrated. For example, the decoder 517 may include a transition detector module, which may be configured to monitor (e.g., continuously) transitions from the registers of interest (e.g., reg_0, reg1[6:0]).

Figure 5:
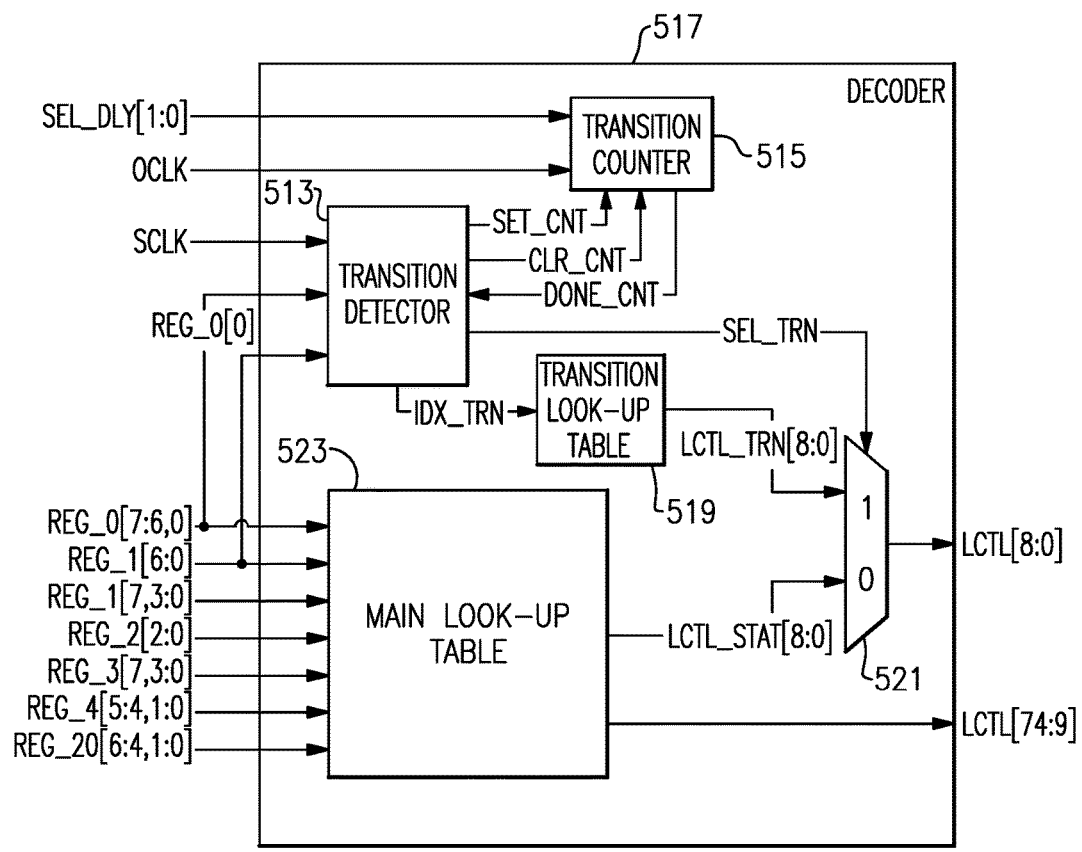
FIG. 5 provides an example corresponding to one or more embodiments showing how dynamic decoding according to the present disclosure may be implemented.

FIG. 5 provides an example corresponding to one or more embodiments showing how dynamic decoding according to the present disclosure may be implemented. The decoder 517 includes a main look-up table 523, which may be a substantially static table configured to provide control signal logic. In certain embodiments, at least a portion of the output of the main look-up table 523 may be multiplexed with output from a transition look-up table when the multiplexer 521 is set to a certain state.

The blocks 513, 515 and 519 demonstrate how the translation state output is inserted into the control signal output of the decoder in certain embodiments. If the transition matches with any of the specified transitions requiring an intermediate state, a detector state-machine 513 of the decoder 517 may activate a transition counter module 515, define an index for the intermediate state, and/or enable a transition selection multiplexor 521 or other selection device or component. In certain embodiments, the transition counter 515 may issue a DONE signal to the detector 513. In order to avoid meta-stability timing problems, the detector state-machine 513 may receive and utilize the clock signal SCLK.

The transition counter module 515 may be activated by the transition detector 513, and may be set to an initial value "INI" based at least in part on the selection delay signal (SEL—DLY[1:0]), which may be used to determine the correct transition delay. The SEL_DLY signal may be set by a user, or may be resolved by the decoder. In certain embodiments, SEL_DLY is internally calculated, or dynamic. The transition counter 515 may provide an output signal DONE_CNT, which indicates a time-out of the counter, wherein the DONE_CNT signal causes the transition detector to select the static output of the main look-up table using the select transition (SEL_TRN) output signal. The counter 515 may be clocked by the continuously running internal clock signal OCLK. In certain embodiments, the initial value "INI" may be derived by the following formula:

$$INI=VAL\_DLY*FRQ\_OCLK \quad (1)$$

When the counter times out, the DONE signal may be sent to the detector 513 and the counter may be stopped.

The decoder further includes a transition look-up table module 519, which may be configured to generate the intermediate state based at least in part on the transition index, which may be defined by the transition detector 513. In certain embodiments, the transition detector generates an output IDX_ TRN for indicating to the transition look-up table 519 what type of transition has occurred, or is occurring.

The transition multiplexor 521 may be configured to pass the output of the transition look-up table module 519 to the decoder output during the transition period, rather than passing the output of the main look-up table module 523 as the decoder output.

Figure 6:
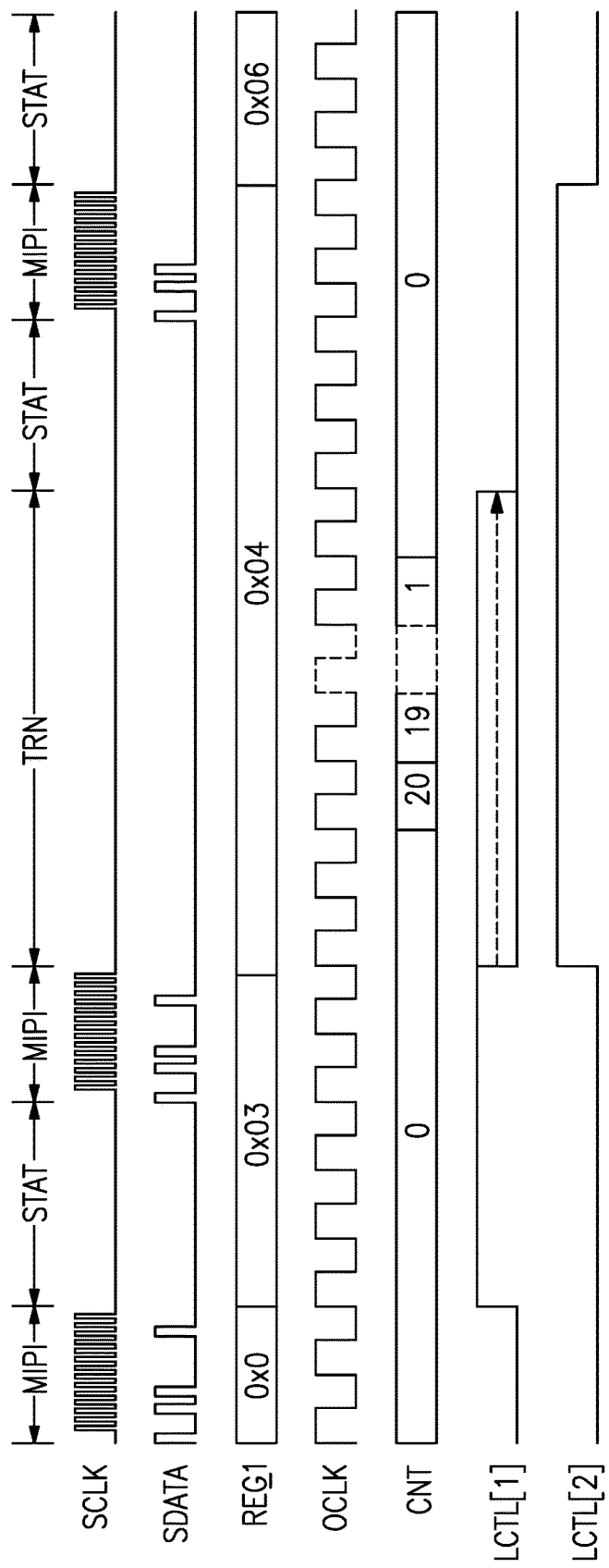
FIG. 6 is a diagram illustrating functionality of a dynamic decoder according to one or more embodiments.

FIG. 6 is a timing diagram illustrating the functionality of the dynamic decoder 517 of FIG. 5 according to one or more embodiments disclosed herein. FIG. 6 shows how the intermediate state may be inserted after an in-need transition according to one or more embodiments. The illustrated periods correspond to new register programming (MIPI), static transition with dynamic transition inactive (STAT), and transition state insertion (TRN).

Embodiments disclosed herein may provide certain advantages and benefits over alternative state-transition solutions. For example, certain embodiments may at least partially prevent or reduce the effects of non-linearity at the RF port and/or ALL-OFF conditions by internally inserting an intermediate state during crucial state transitions only when they are determined to be needed. Furthermore, certain embodiments may not introduce additional burden with respect to software programming. Certain embodiments may provide for digital implementation with proper clock-synchronization that substantially guarantees full functionality with immunity to process, supply and/or temperature variations.

Packaged Module Implementation

Figure 7B:
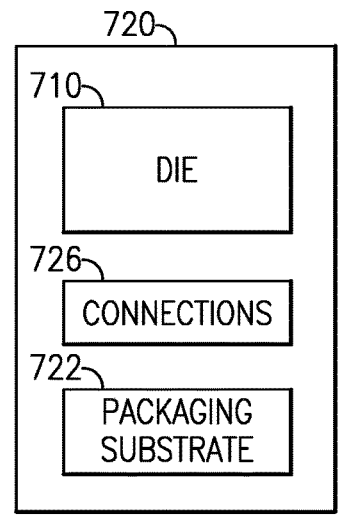
FIG. 7B is a block diagram representing a die according to one or more embodiments.
Figure 7A:
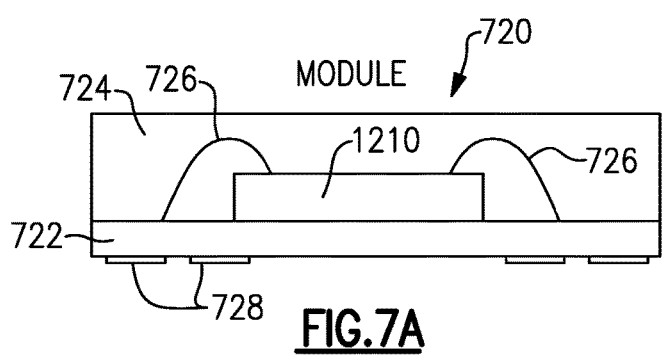
FIG. 7A illustrates a die according to one or more embodiments.

In some embodiments, a die having one or more features as described herein can be implemented in a module. FIG. 7A shows an example of such a module 720, and FIG. 7B shows a block diagram representation of the same. The module 720 can include a die 710, which may be mounted on a packaging substrate 722, and can be protected by an overmold structure. Electrical connections to and from the die 710 can be facilitated by connections 726 such as wirebonds. Such wirebonds can be interconnected to connection pads 728 formed on the module so as to facilitate connectivity to other modules and/or external components.

In some embodiments, the module 720 can also include one or more surface-mount devices (SMD) mounted on the packaging substrate 722 and configured to facilitate and/or complement the functionality of the integrated circuits in the die 710. In some embodiments, the module 720 can also include one or more packaging structures to, for example, provide protection and facilitate easier handling of the module 720. Such a packaging structure can include an overmold formed over the packaging substrate 722 and dimensioned to substantially encapsulate the various circuits and components thereon. It will be understood that although the module 720 is described in the context of wirebond-based electrical connections, one or more features of the present disclosure can also be implemented in other packaging configurations, including flip-chip configurations.

Figure 8:
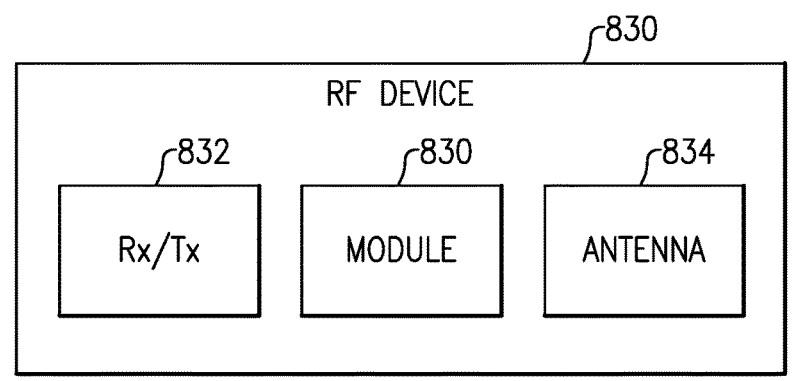
FIG. 8 is a block diagram representing a radio-frequency device according to one or more embodiments.

In some embodiments, a module or a die having one or more metal gate structures as described herein can be implemented in a radio-frequency (RF) device. FIG. 8 shows an example of such an RF device 830. The RF device 830 can include a module 820 similar to the module described in reference to FIGS. 7A and 7B. In some implementations, such a module can facilitate operation of a transmit/receive circuit 832 and an antenna 834. In some embodiments, the module 820 can be configured to provide, for example, amplification of RF signals, switching of RF signals, and/or other RF related functions.

Wireless Device Implementation

In some implementations, a device and/or a circuit having one or more features described herein can be included in a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 9:
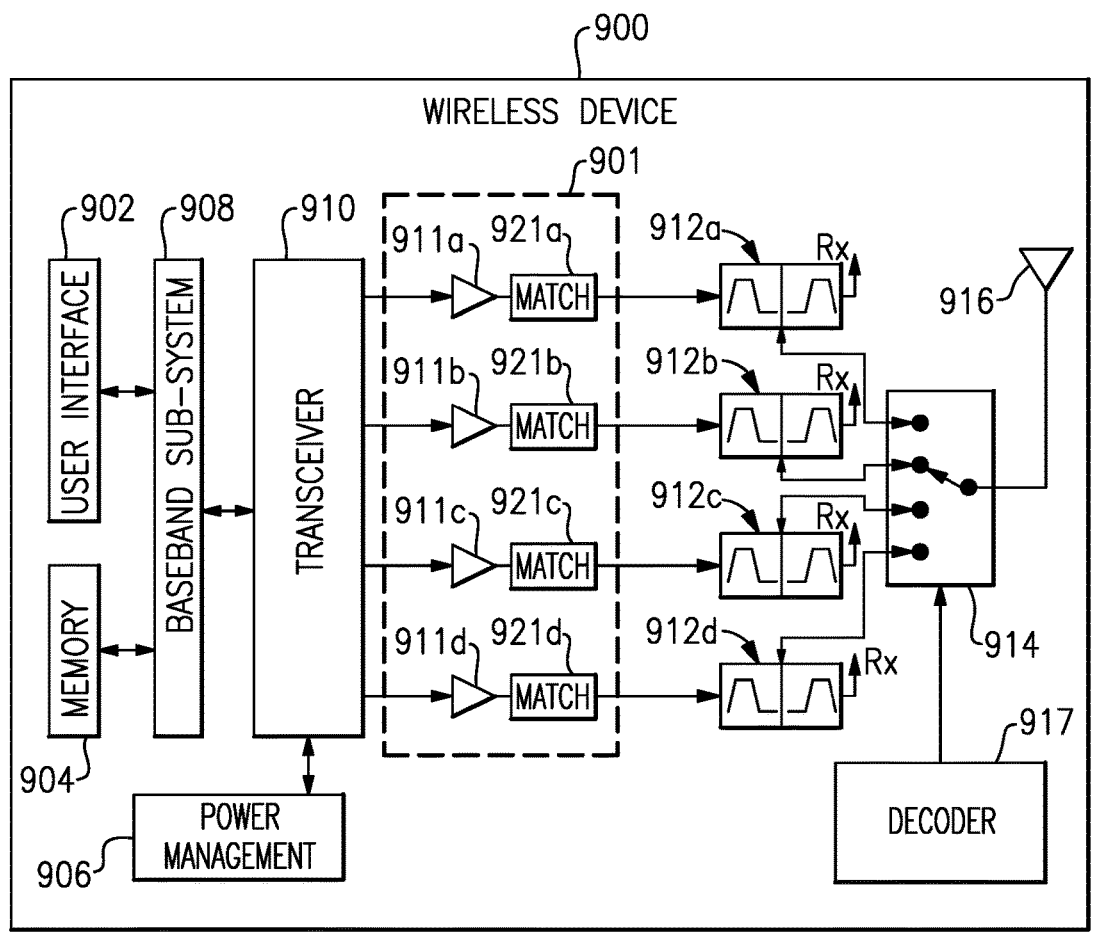
FIG. 9 is a block diagram representing a wireless device according to one or more embodiments.

FIG. 9 schematically depicts an example wireless device 900 having one or more advantageous features described herein. One or more PAs 110 are shown, which can facilitate, for example, multi-band operation of the wireless device 900. In embodiments where the PAs and their matching circuits are packaged into a module, such a module can be represented by a dashed box 301.

The PAs 911 can receive their respective RF signals from a transceiver 910 that can be configured and operated in known manners to generate RF signals to be amplified and transmitted, and to process received signals. The transceiver 910 is shown to interact with a baseband sub-system 908 that is configured to provide conversion between data and/or voice signals suitable for a user and RF signals suitable for the transceiver 910. The transceiver 910 is also shown to be connected to a power management component 906 that is configured to manage power for the operation of the wireless device. Such power management can also control operations of the baseband sub-system 908 and the module 901.

The baseband sub-system 908 is shown to be connected to a user interface 902 to facilitate various input and output of voice and/or data provided to and received from the user. The baseband sub-system 908 can also be connected to a memory 904 that is configured to store data and/or instructions to facilitate the operation of the wireless device, and/or to provide storage of information for the user.

In the example wireless device 900, outputs of the PAs 911 are shown to be matched (via match circuits 921) and routed to an antenna 916 via their respective duplexers 912*a*-912*d* and a band-selection switch 914. The band-selection switch 914 can include, for example, a single-pole-multiple-throw (e.g., SP4T) switch to allow selection of an operating band (e.g., Band 2). In some embodiments, each duplexer 912 can allow transmit and receive operations to be performed simultaneously using a common antenna (e.g., 916). In FIG. 9, received signals are shown to be routed to "Rx" paths (not shown) that can include, for example, a low-noise amplifier (LNA). The switch 914 may be associated with a decoder 917 configured to provide control signals to at least partially control the operation of the switch 914 and/or other component(s) to prevent ALL-OFF conditions as described herein.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS. The components described above in connection with FIG. 9 and wireless device 900 are provided as examples, and are non-limiting. Moreover, the various illustrated components may be combined into fewer components, or separated into additional components. For example, baseband sub-system 908 can be at least partially combined with the transceiver 910. As another example, the transceiver 910 can be split into separate receiver and transmitter portions.

The wireless device 900 may include one or more pseudomorphic high electron mobility transistors (pHEMT), metal semiconductor field effect transistors (MESFET), heterojunction bipolar transistors (HBT), bipolar FETs (BiFET), bipolar HEMTs (BiHEMT), and/or surface acoustic wave (SAW) devices (e.g., SAW filter or resonator) that can include or be connected to gate structures having one or more features as described herein. It will be understood that other semiconductor devices utilized in wireless devices can also benefit from such gate structures. It will also be understood that semiconductor devices associated with other types of electronic devices can also benefit from gate structures having one or more features as described herein.

Other Embodiments

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

What is claimed is:

1. An antenna switch module comprising:
a radio-frequency input port;
a radio-frequency output port;
a radio-frequency core connected between the radio-frequency input port and the radio-frequency output port, the radio-frequency core being configured to operate in each of a plurality of operational states, the plurality of operational states including a first subset of operational states and a second subset of operational states; and
a decoder configured to receive an input signal indicating a first operational state of the radio-frequency core, the first operational state being of the first subset of operational states, generate an output control signal corresponding to the first operational state, detect a transition of the radio-frequency core to a second operational state, determine that the second operational state is of the second subset of operational states, and insert an intermediate output signal corresponding to an intermediate operational state of the radio-frequency core in response to said determination.

2. The antenna switch module of claim 1 wherein said inserting the intermediate output signal prevents an ALL-OFF condition with respect to one or more of the radio-frequency input port and radio-frequency output port.

3. The antenna switch module of claim 1 wherein the intermediate output signal causes a delay in transition of one or more radio-frequency devices of the radio-frequency core.

4. The antenna switch module of claim 1 wherein the radio-frequency core includes a plurality of transistors, the output control signal controlling operation of the plurality of transistors.

5. The antenna switch module of claim 1 wherein the radio-frequency core includes an input switch circuit and an output switch circuit.

6. The antenna switch module of claim 1 wherein the decoder includes a first clock signal input for receiving a first clock signal and a second clock signal input for receiving a second clock signal.

7. The antenna switch module of claim 6 wherein the first clock signal is provided by a negative voltage generator.

8. A method for controlling an antenna switch module, the method comprising:
receiving an input signal indicating an operational state of a radio-frequency core of an antenna switch module, the radio-frequency core being configured to operate in each of a plurality of operational states, the plurality of operational states including a first subset of operational states and a second subset of operational states;

determining a first operational state of the radio-frequency core based on the input signal, the first operational state being of the first subset of operational states;

generating an output control signal corresponding to the first operational state;

detecting a pending transition of the radio-frequency core to a second operational state, the second operational state being of the second subset of operational states; and in response to said detecting the pending transition, generating an intermediate output signal and providing the intermediate output signal to the radio-frequency core.

9. The method of claim 8 wherein the intermediate output signal causes a delay in transition of one or more radio-frequency devices of the radio-frequency core.

10. The method of claim 8 wherein the radio-frequency core includes a plurality of transistors, the output control signal controlling operation of the plurality of transistors.

11. The method of claim 8 further comprising:
selecting a delay period from among a plurality of delay periods; and
delaying at least in part transition of the radio-frequency core to the second operational state by said providing the intermediate output signal to the radio-frequency core.

12. The method of claim 11 wherein said selecting the delay period is based on a delay selection input signal identifying the delay period.

13. The method of claim 8 wherein the radio-frequency core includes an input switch circuit and an output switch circuit.

14. The method of claim 8 further comprising receiving a first clock signal over a first clock signal input and receiving a second clock signal over a second clock signal input.

15. The method of claim 14 wherein the first clock signal is received from a negative voltage generator.

16. A wireless device comprising:
a transceiver configured to process radio-frequency signals;

a radio-frequency module in communication with the transceiver, the radio-frequency module including a radio-frequency core configured to operate in each of a plurality of operational states including a first subset of operational states and a second subset of operational states, and a decoder configured to receive an input signal indicating a first operational state of the radio-frequency core, the first operational state being of the first subset of operational states, generate an output control signal corresponding to the first operational state, detect a transition of the radio-frequency core to a second operational state, determine that the second operational state is of the second subset of operational states, and insert an intermediate output signal corresponding to an intermediate operational state of the radio-frequency core in response to said determination; and an antenna in communication with the radio-frequency module, the antenna configured to facilitate transmitting and receiving of the radio-frequency signals.

17. The wireless device of claim 16 wherein said insertion of the intermediate output signal substantially prevents an ALL-OFF condition with respect to one or more of a radio-frequency input port and a radio-frequency output port of the radio-frequency module.

18. The wireless device of claim 16 wherein the intermediate output signal causes a delay in transition of one or more radio-frequency devices of the radio-frequency module.

19. The wireless device of claim 18 wherein the one or more radio-frequency devices includes a plurality of transistors, the output control signal controlling operation of the plurality of transistors.

20. The wireless device of claim 16 wherein the decoder includes a first clock signal input for receiving a first clock signal and a second clock signal input for receiving a second clock signal.

* * * * *